(12) United States Patent
Ranalli et al.

(10) Patent No.: US 7,468,086 B2
(45) Date of Patent: Dec. 23, 2008

(54) DEVICE FOR CLEANING VEHICULAR EXHAUST GAS, IN PARTICULAR A DIESEL EXHAUST PARTICLE FILTER, AND VEHICLE COMPRISING SUCH DEVICE

(75) Inventors: Marco Ranalli, Augsburg (DE); Christoph Noller, Konigsbrunn (DE)

(73) Assignee: ET US Holdings LLC, Wilmington, DE (US)

( * ) Notice: Subject to any disclaimer, the term of this patent is extended or adjusted under 35 U.S.C. 154(b) by 554 days.

(21) Appl. No.: 11/089,637

(22) Filed: Mar. 25, 2005

(65) Prior Publication Data
US 2005/0217227 A1 Oct. 6, 2005

(30) Foreign Application Priority Data
Apr. 5, 2004 (DE) .................. 10 2004 016 690

(51) Int. Cl.
*B01D 46/00* (2006.01)
(52) U.S. Cl. .................. 55/523; 55/385.3; 55/483; 55/DIG. 30
(58) Field of Classification Search .................. 55/523, 55/524, 482.1, 483, 484, 385.3, DIG. 30; 422/177
See application file for complete search history.

(56) References Cited

U.S. PATENT DOCUMENTS

| | | |
|---|---|---|
| 4,270,936 A | 6/1981 | Mann |
| 4,276,066 A | 6/1981 | Bly et al. |
| 4,281,512 A | 8/1981 | Mills |
| 4,319,896 A | 3/1982 | Sweeney |
| 4,335,574 A | 6/1982 | Sato et al. |
| 4,373,330 A | 2/1983 | Stark |
| 4,381,643 A | 5/1983 | Stark |
| 4,436,538 A * | 3/1984 | Tomita et al. .................. 55/482 |
| 4,481,767 A | 11/1984 | Stark |
| 4,520,624 A | 6/1985 | Kiyota et al. |
| 4,573,317 A | 3/1986 | Ludecke |
| 4,651,524 A | 3/1987 | Brighton |
| 4,730,455 A | 3/1988 | Pischinger et al. |
| 4,840,028 A | 6/1989 | Kusuda et al. |
| 4,848,083 A | 7/1989 | Goerlich |
| 4,851,015 A | 7/1989 | Wagner et al. |

(Continued)

FOREIGN PATENT DOCUMENTS

EP 1 236 872 A1 1/2002

(Continued)

OTHER PUBLICATIONS

European Search Report for U.S. Appl. No. 11/089,637, dated Mar. 19, 2007, 3 pages.

*Primary Examiner*—Duane Smith
*Assistant Examiner*—Robert A Clemente
(74) *Attorney, Agent, or Firm*—Barnes & Thornburg LLP

(57) ABSTRACT

In a device for cleaning vehicular exhaust gas, in particular a diesel exhaust particle filter, the individual bodies which together constitute a one-piece filter body, are arranged so as to have an oblique angle with an axis of symmetry of the filter body and/or with the horizontal plane, here in relation to the installation condition of the device in the vehicle and/or an underside of the filter body having a reduced curvature compared to portions of the outer contour adjoining the underside.

16 Claims, 3 Drawing Sheets

U.S. PATENT DOCUMENTS

| | | | |
|---|---|---|---|
| 5,024,054 A | 6/1991 | Barris et al. | |
| 5,048,287 A | 9/1991 | Howe et al. | |
| 5,063,737 A | 11/1991 | Lopez-Crevillen et al. | |
| 5,065,574 A | 11/1991 | Bailey | |
| 5,094,075 A | 3/1992 | Berendes | |
| 5,140,814 A | 8/1992 | Kreutmair et al. | |
| 5,207,989 A * | 5/1993 | MacNeil | 422/179 |
| 5,211,009 A | 5/1993 | Houben et al. | |
| 5,251,564 A | 10/1993 | Rim et al. | |
| 5,365,733 A | 11/1994 | Takeshima et al. | |
| 5,656,048 A | 8/1997 | Smith et al. | |
| 5,853,459 A | 12/1998 | Kuwamoto et al. | |
| 5,914,187 A * | 6/1999 | Naruse et al. | 428/327 |
| 5,934,069 A | 8/1999 | Hertl et al. | |
| 5,946,906 A | 9/1999 | Akazaki et al. | |
| 6,012,284 A | 1/2000 | Tanaka et al. | |
| 6,063,150 A | 5/2000 | Peter et al. | |
| 6,182,445 B1 | 2/2001 | Yamazaki et al. | |
| 6,233,926 B1 | 5/2001 | Bailey et al. | |
| 6,317,976 B1 | 11/2001 | Aranda et al. | |
| 6,321,533 B1 | 11/2001 | Watanabe et al. | |
| 6,327,852 B1 | 12/2001 | Hirose | |
| 6,344,306 B1 | 2/2002 | Fujiyoshi et al. | |
| 6,422,006 B2 | 7/2002 | Ohmori et al. | |
| 6,669,751 B1 * | 12/2003 | Ohno et al. | 55/523 |
| 6,694,727 B1 | 2/2004 | Crawley et al. | |
| 6,709,489 B2 * | 3/2004 | Ament et al. | 95/278 |
| 6,736,870 B2 * | 5/2004 | Best et al. | 55/282.3 |
| 6,902,599 B2 * | 6/2005 | Bardon | 55/523 |
| 6,908,498 B2 * | 6/2005 | Ament et al. | 95/278 |
| 6,984,253 B2 * | 1/2006 | Ichikawa et al. | 55/484 |
| 7,029,511 B2 * | 4/2006 | Ichikawa et al. | 55/523 |
| 7,052,760 B2 * | 5/2006 | Hijikata | 428/116 |
| 7,078,086 B2 * | 7/2006 | Hijikata | 428/116 |
| 7,087,286 B2 * | 8/2006 | Hijikata | 428/116 |
| 7,112,233 B2 * | 9/2006 | Ohno et al. | 55/523 |
| 7,138,002 B2 * | 11/2006 | Hamanaka et al. | 55/523 |
| 7,214,253 B2 * | 5/2007 | Bardon et al. | 55/523 |
| 2002/0038536 A1 * | 4/2002 | Best et al. | 55/282.3 |
| 2005/0126140 A1 * | 6/2005 | Ito et al. | 55/523 |
| 2005/0247038 A1 * | 11/2005 | Takahashi | 55/523 |
| 2006/0213163 A1 * | 9/2006 | Taoka et al. | 55/523 |
| 2007/0068128 A1 * | 3/2007 | Oshimi et al. | 55/523 |

FOREIGN PATENT DOCUMENTS

| | | |
|---|---|---|
| EP | 1371406 | 12/2003 |
| GB | 2 134 407 A | 8/1984 |
| JP | 58104314 | 6/1983 |
| WO | 03078026 | 9/2003 |

* cited by examiner

State of the Art

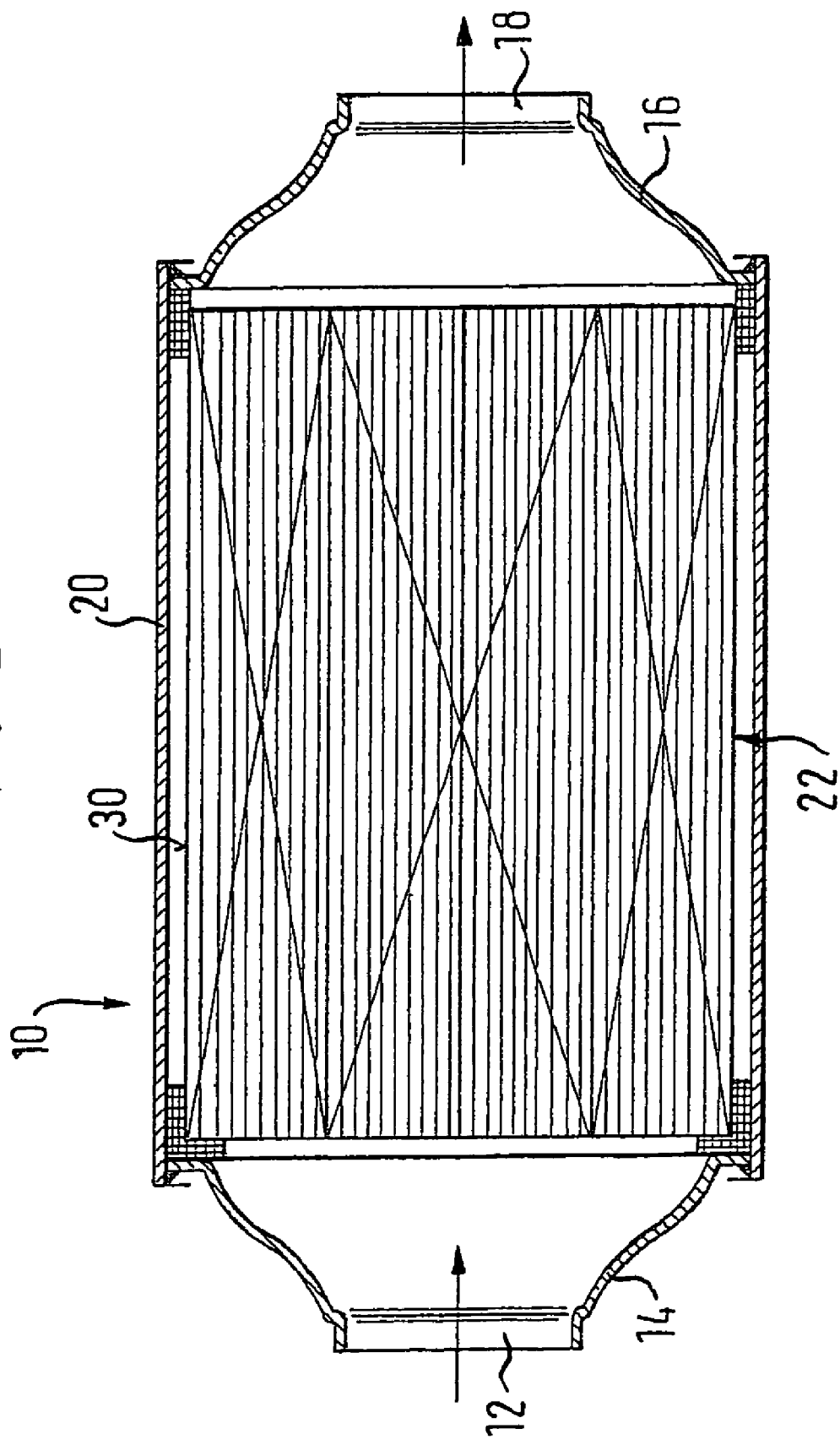

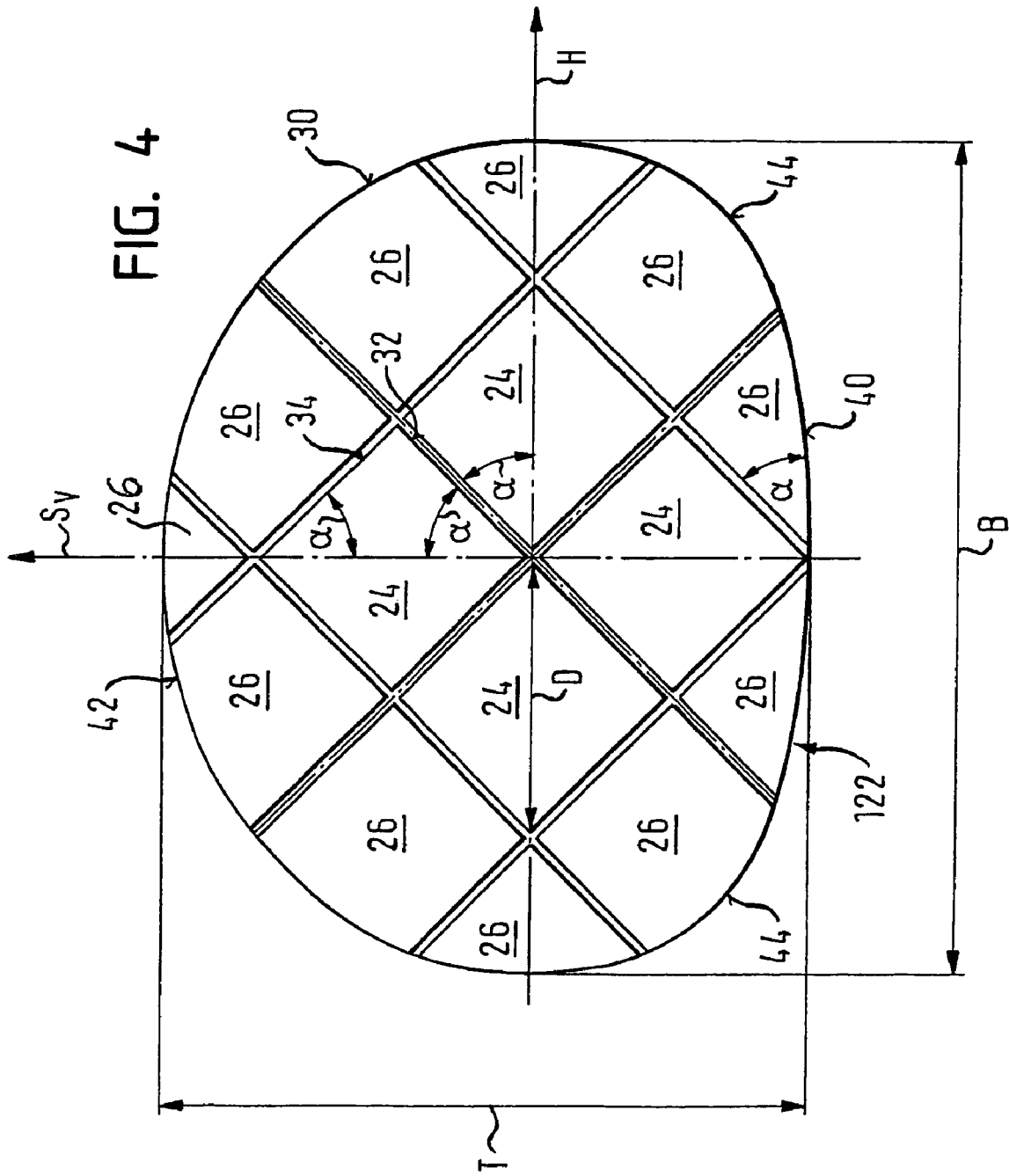

DEVICE FOR CLEANING VEHICULAR EXHAUST GAS, IN PARTICULAR A DIESEL EXHAUST PARTICLE FILTER, AND VEHICLE COMPRISING SUCH DEVICE

This application claims the benefit under 35 U. S. C. § 119 of DE 102004016690.0 which was filed in the Federal Republic of Germany on Apr. 5, 2004 and is hereby incorporated by reference herein.

FIELD OF THE DISCLOSURE

The present application relates generally to a device for cleaning vehicular exhaust gas. More particularly, it relates to a diesel exhaust particle filter.

BACKGROUND OF THE DISCLOSURE

There is a device for cleaning vehicular exhaust gas, in particular a diesel exhaust particle filter, comprising a one-piece filter body which has gas flowing through it and is composed of a plurality of cuboid individual bodies and, as seen in cross-section, has a round outer contour deviating from a circular shape, the individual bodies located in the interior of the filter body having a square cross-section delimited by side faces, and neighboring, machined individual bodies having plane side faces adjoining the side faces of the internal individual bodies.

Such filter bodies usually are composed of extruded one-piece monolithic individual bodies which are glued to each other and in particular are made from SiC material, these elongate individual bodies in their commercially available form preferably having a square cross-section. On one end face, the individual bodies have numerous inflow channels which end in a blind hole each, are arranged honeycomb-like and which in particular have a square cross-section, and adjoining to these the individual bodies have effusion channels which have no direct flow connection and are formed by likewise honeycomb-like blind holes, more specifically square blind holes as seen in cross-section, emanating from the opposite end face. The exhaust gas flows from the inflow side end wall into the numerous channels, diffuses through the adjoining wall to the effusion channels, while the carbon particulate matter is retained in the inflow channel. The exhaust gas catalytic converters are appropriately constructed from coated filter bodies. The filter body composed of individual bodies is machined on the outside, is in particular turned on a lathe. Up to now, there are installed elongate filter bodies, among other things, which have a circular outer contour. Meanwhile, however, one has started thinking about filter bodies which are provided with a round outer contour deviating from a circular shape, which in particular are larger in width than in height, so that they have as small an overall height as possible in the region of the underbody.

One example of a contemplated filter body of this type is illustrated in FIG. 1. This filter body has an oval, more specifically even an elliptic outer contour and is composed of 18 individual bodies in total. Six individual bodies 2 having a square cross-section and an unmachined outer circumference are located in the interior of the filter body, and are surrounded by machined individual bodies 4 and 6. Here, the eight individual bodies 4 are formed by eight originally square, unmachined individual bodies which are machined on the outside not until the composite is obtained. The four smallest individual bodies 6 are produced by two individual bodies which are sawn up in the longitudinal direction into two small sections. These sections are then glued into the corresponding gaps. In this known filter body, it is laid great importance to the fact to accommodate as many individual bodies—as in fact unmachined individual bodies—in the interior of the filter body as possible, i.e. as many individual bodies 2 as possible. This is due to the fact that the external, machined individual bodies will loose a superproportionally large active filter surface area with respect to internal, unmachined individual bodies with square end face. This means that the individual bodies machined on their circumference loose considerably more filtering capacity than cross-sectional surface, as seen in relation to the unmachined individual bodies. In the embodiment of FIG. 1 according to prior art there is needed a total of 18 individual bodies for the filter body.

SUMMARY OF THE DISCLOSURE

In a device of the type initially mentioned the side faces are arranged so as to have an oblique angle with an axis of symmetry of the filter body and/or, relative to the installation condition of the device in the vehicle, with the horizontal plane.

Alternatively or in addition, provision can be made that the side faces are arranged so as to have an oblique angle with an underside of the filter body, which underside has a reduced curvature compared to the adjoining portions of the outer contour.

In prior art according to FIG. 1 attention was paid to the fact that on the one hand there are provided as many unmachined individual bodies as possible in the interior of the filter body, and on the other hand these individual bodies were positioned such that their sides faces were parallel and at right angles to a vertical axis of symmetry $S_V$ and a horizontal axis of symmetry $S_H$. In prior art, the axis of symmetry $S_H$ preferably lies in a horizontal plane H. This horizontal plane is related to the installed condition of the device in the vehicle. As the installation condition of their device is always laid down for the suppliers of vehicular exhaust cleaning systems by the vehicle manufacturers, or as suppliers have to construct their cleaning device within the frame of this installation condition, the installation position of the device with respect to a vehicle is always clearly defined, especially as the device in fact is fixedly flange-mounted in the vehicle at predefined points.

The invention disregards the prescribed teaching established in prior art and now provides to rotate the individual bodies relative to the axis of symmetry and/or the horizontal plane, so that the side faces of the individual bodies are located so as to have an oblique angle with the axis of symmetry/horizontal plane. "Oblique" means that the side faces neither lie in parallelism with nor at right angles to the reference axis or reference plane. By such oblique arrangement the number of individual bodies required for manufacturing the filter body can be reduced, as will be explained below with the aid of FIG. 3.

The axis of symmetry is arranged so as to be essentially vertical, relative to the installation condition; the filter body, however, can also have axes of symmetry which are perpendicular to each other, always relative to the cross-section.

Arranging the individual bodies is preferably done so as to be symmetrical to the axis/axes of symmetry, i.e. there always arises a symmetric pattern relative to the axis/axes of symmetry.

It is preferred that the axis of symmetry is perpendicular to the horizontal plane.

According to the preferred embodiment the oblique angle lies in a range from 25° to inclusively 45°, it preferably amounts to approximately 45°.

The arrangement according to the invention of the individual bodies is particularly useful especially with filter bodies having a width which amounts to a maximum of 4.5 times the diagonal of the unmachined individual bodies. The height should be smaller and amount to a maximum of 3.5 times the diagonal.

The disclosure relates in particular to a device in which the filter body has a width and height which each are in the range from 2 to 3.5 times the diagonal of the individual bodies used.

The disclosure further relates to a device comprising a filter body which is larger in width than in height.

The individual bodies are oriented such that a center of the filter body is formed by at least four unmachined individual bodies which are inclined with respect to the axis of symmetry/horizontal plane/reference area.

The one-piece filter body in particular has an oval or even elliptic outer contour, as seen in cross-section.

The disclosure further relates to a vehicle comprising a device according to the invention.

BRIEF DESCRIPTION OF THE DRAWINGS

The above and further features of the present disclosure will be apparent from the following description and the following drawings to which reference is made and in which:

FIG. 2 is a longitudinal sectional view through a device according to the invention for cleaning vehicular exhaust gas, here of a diesel exhaust particle filter, as part of the vehicle according to the invention, FIG. 4 is a sectional view through a slightly modified, one-piece filter body that can be employed with the device according to the invention.

DETAILED DESCRIPTION OF THE DRAWINGS

Figure 3:
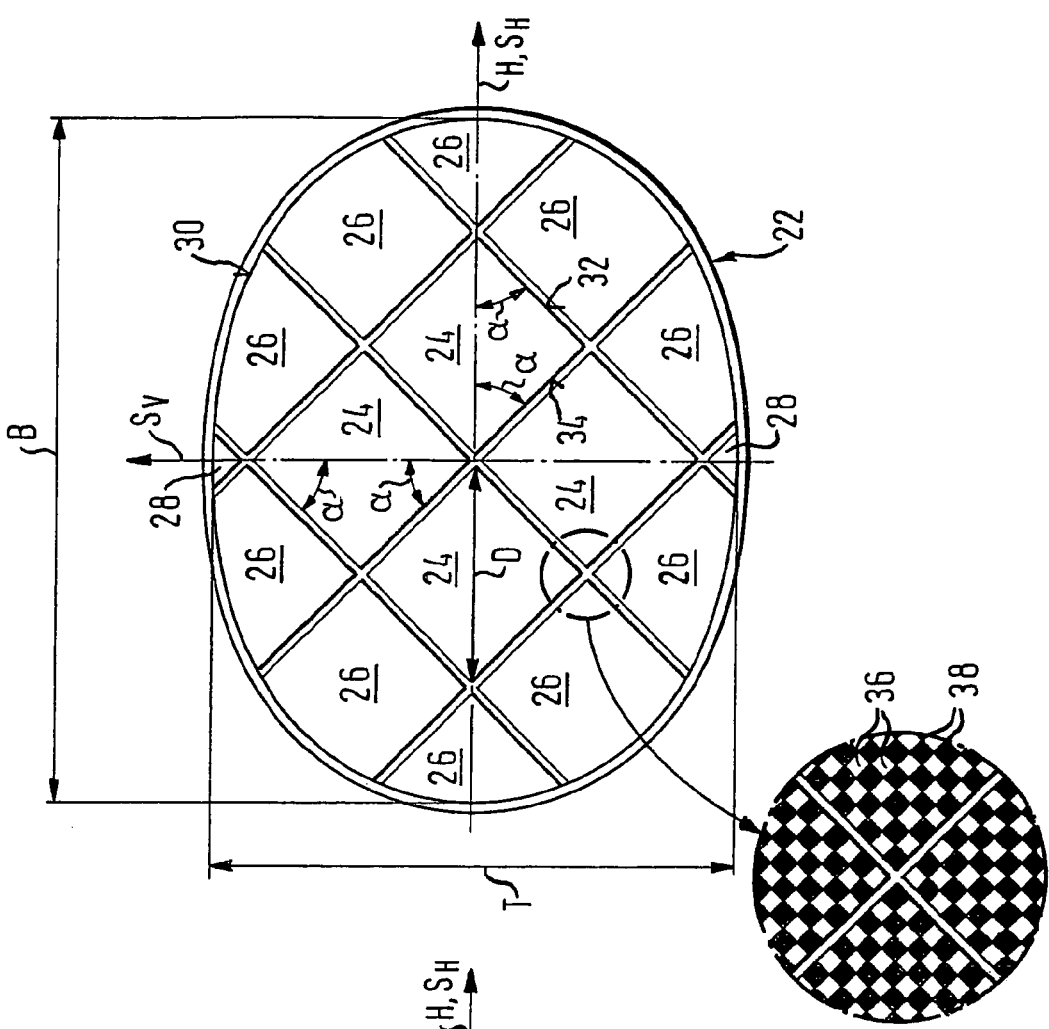
FIG. 3 is a sectional view through the one-piece filter body used in the device according to FIG. 2, with an additional detail view on an enlarged scale.

While the concepts of the present disclosure are susceptible to various modifications and alternative forms, specific exemplary embodiments thereof have been shown by way of example in the drawings and will herein be described in detail. It should be understood, however, that there is no intent to limit the disclosure to the particular forms disclosed, but on the contrary, the intention is to cover all modifications, equivalents, and alternatives following within the spirit and scope of the invention as defined by the appended claims.

FIG. 2 illustrates a device used for cleaning vehicular exhaust gas and situated in the exhaust tract of the vehicle. The device shown is a diesel exhaust particle filter, but it may also be designed as a catalytic converter.

The device has an elongate housing 10 composed of several parts, namely a funnel-shaped portion 14 provided with an inflow port 12, a funnel-shaped portion 16 provided on the opposite end and having an effusion port 18, as well as a circumferential wall 20 formed by a deformed tube or by folding a sheet of metal.

Accommodated in the interior of the housing 10 is a one-piece filter body 22 which is composed of a plurality of cuboid individual bodies 24, 26, 28 (see FIG. 3). In particular, the individual bodies 24 to 28 are extruded one-piece SiC bodies with a lateral length of 340 mm, the length of which is equal to the length of the entire filter body 22 and which have a rod-shaped appearance. The individual bodies 24 to 28 arranged in rows have a square cross-section and their marginal areas are glued to neighboring individual bodies 24 to 28, with a chessboard pattern arising.

FIG. 3 shows that the filter body 22 has internal individual bodies 24 which—as delivered from the factory—are supplied with an unmachined external surface and after having been glued to each other stay unmachined (chip removal cutting) on the circumferential side, and of peripheral individual bodies 26, 28. When glued to each other, these peripheral individual bodies 26, 28 are machined on the outer circumference, so that an oval outer contour will arise, to be more precise, in this example even an elliptic one. In particular oval outer contours are used and semi-cylindrical short sides and tangential longitudinal sides connecting these.

FIG. 3 shows the installation position of the filter body 22 in the vehicle. The filter body 22 has a symmetrical shape, with a vertical axis of symmetry $S_V$ and a horizontal axis of symmetry $S_H$ at right angles thereto. In the present example the axis of symmetry $S_H$ coincides with the horizontal plane H. Further, it would also be possible that the filter body 22 lies so as to be slightly tilted with respect to the horizontal plane H, i.e. that the axis of symmetry $S_H$ lies under an acute angle to the horizontal plane H.

The width B of the filter body 22 exceeds its height T. Here, width B and height T are in the range from 2 to 3.5 times the diagonal D of the unmachined individual bodies 24 to 28 which in the unmachined state all have the same dimensions.

In FIG. 3 there is also to be seen that the plane side faces 32, 34 of all individual bodies 24 to 28 are arranged so as to have an oblique angle $\alpha$ with the axes of symmetry $S_H$, $S_V$ and with the horizontal plane H. This angle $\alpha$ preferably ranges from 25° to 45°, and in the illustrated preferred embodiment it amounts to approximately 45°. This means that the diagonals of the individual bodies 24 to 28 run in parallelism with or at right angles to the axes of symmetry $S_H$, $S_V$ and the horizontal plane H. Hence, they also extend so as to be perpendicular to or parallel with that line segment in the interior of the filter body 22 which defines the maximum width B of the filter body 22 (in the present case this would be the part of the axis of symmetry $S_H$ which lies in the interior of the filter body 22).

As seen in cross-section, the orientation and arrangement of the individual bodies 24 to 28 is made so as to be symmetrical to the axis/axes of symmetry $S_V$ and $S_H$, so that a pattern will arise which is symmetrical to these axes.

Figure 1:
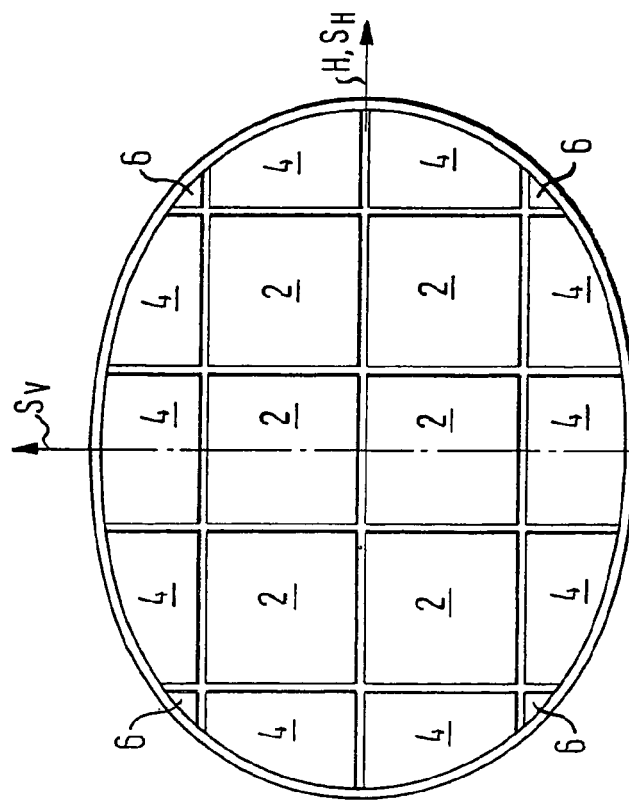
FIG. 1 shows the already explained sectional view through a one-piece filter body of a device according to prior art.

As is surprisingly found on the basis of a comparison of FIGS. 1 and 3, for achieving the same cross-sectional area a markedly lower number of individual bodies 24 to 28 is needed according to the embodiment of the invention. Among the four unmachined, internal individual bodies 24 there are used ten individual bodies 26 which are machined on a relative large portion of their surface area, as well as an individual body 28 longitudinally sawn up into two parts, which finally makes the partial individual bodies 28 with the smallest cross-section.

In the embodiment according to FIG. 3 there are only used 15 individual bodies, which only becomes possible owing to the diagonal arrangement, while in the embodiment according to prior art there are required 18 individual bodies for forming the filter body.

Concerning the shape of the individual bodies 24 to 28, these have numerous inflow channels 36 with a honeycomb-like or square cross-section (see the extracted enlarged view in FIG. 3), which alternate with essentially square walls 38, so that a kind of honeycomb structure or chessboard pattern arises. The inflow channels 36 extend deeply into the individual bodies 24 to 28 and end therein in each case as a blind hole by plugs being pressed into the inflow channels 36 at the outflow side end. Effusion channels protrude from the opposite end face, from the effusion side, into the walls 38 and end therein likewise as blind holes. Thus, on the opposite end face there also arises a view with a similar honeycomb or chessboard pattern, which just is offset with respect to the pattern at the inflow side.

The embodiment according to FIG. 4 corresponds with regard to the construction of the filter body 122 as far as possible to the filter body 22 of FIG. 3. The filter body 122 has an oval outer contour 30 which, however, is only symmetrical to the axis $S_V$. A second axis of symmetry such as the axis of symmetry $S_H$ does not exist here. The axis of symmetry $S_V$ is at right angles to the horizontal plane H, but it can also extend so as to be slightly tilted thereto. Relative to the installed condition, the outer contour 30 has a flattened underside 40 with a substantially shallower curvature than the upper side 42 and the intermediate portions 44 adjoining the underside 40.

Also in this embodiment the number of the required individual bodies 24 to 26 is strongly reduced in that they extend so as to be tilted relative to the axis of symmetry $S_V$, the horizontal plane H and also to the underside 40, in fact at an angle a which ranges from 25° to 45° and in the present case does amount to 4520.

In this embodiment, too, the diagonal of the square individual bodies 24 to 26 is substantially aligned so as to be parallel to the line segment defining the maximum thickness, in the present case this being width B. Also in this embodiment width B exceeds height T, and both range from 2 to 3.5 times the diagonal D of the individual bodies 24 to 26 used.

While the concepts of the present disclosure have been illustrated and described in detail in the drawings and foregoing description, such an illustration and description is to be considered as exemplary and not restrictive in character, it being understood that only the illustrative embodiments have been shown and described and that all changes and modifications that come within the spirit of the disclosure are desired to be protected.

There are a plurality of advantages of the concepts of the present disclosure arising from the various features of the systems described herein. It will be noted that alternative embodiments of each of the systems of the present disclosure may not include all of the features described yet still benefit from at least some of the advantages of such features. Those of ordinary skill in the art may readily devise their own implementations of a system that incorporate one or more of the features of the present disclosure and fall within the spirit and scope of the invention as defined by the appended claims.

The invention claimed is:

1. A device for cleaning vehicular exhaust gas, in particular a diesel exhaust particle filter, comprising
   a one-piece filter body which has gas flowing through it and is composed of a plurality of cuboid individual bodies and, as seen in cross-section, has a round outer contour deviating from a circular shape,
   the individual bodies located in the interior of the filter body having a square cross-section delimited by side faces, and neighboring, machined individual bodies having plane side faces adjoining the side faces of the internal individual bodies,
   wherein the side faces are arranged so as to have an oblique angle with one of
      an axis of symmetry of the filter body,
      a horizontal plane, seen in the installation condition of the device in a vehicle, and
      an underside of the filter body having a reduced curvature compared to portions of the outer contour adjoining the underside,
   wherein the axis of symmetry is arranged so as to be essentially vertical, relative to the installation condition, and
   wherein the arrangement of the individual bodies is symmetrical to the axis of symmetry.

2. A device for cleaning vehicular exhaust gas, in particular a diesel exhaust particle filter, comprising
   a one-piece filter body which has gas flowing through it and is composed of a plurality of cuboid individual bodies and, as seen in cross-section, has a round outer contour deviating from a circular shape,
   the individual bodies located in the interior of the filter body having a square cross-section delimited by side faces, and neighboring, machined individual bodies having plane side faces adjoining the side faces of the internal individual bodies,
   wherein the side faces are arranged so as to have an oblique angle with one of an axis of symmetry of the filter body,
      a horizontal plane, seen in the installation condition of the device in a vehicle, and
      an underside of the filter body having a reduced curvature compared to portions of the outer contour adjoining the underside, and
   wherein the filter body has axes of symmetry which are perpendicular to each other.

3. The device according to claim 2, wherein the arrangement of the individual bodies is symmetrical to the axes of symmetry.

4. A device for cleaning vehicular exhaust gas, in particular a diesel exhaust particle filter, comprising
   a one-piece filter body which has gas flowing through it and is composed of a plurality of cuboid individual bodies and, as seen in cross-section, has a round outer contour deviating from a circular shape,
   the individual bodies located in the interior of the filter body having a square cross-section delimited by side faces, and neighboring, machined individual bodies having plane side faces adjoining the side faces of the internal individual bodies,
   wherein the side faces are arranged so as to have an oblique angle with one of an axis of symmetry of the filter body,
      a horizontal plane, seen in the installation condition of the device in a vehicle, and
      an underside of the filter body having a reduced curvature compared to portions of the outer contour adjoining the underside, and
   wherein the oblique angle amounts to approximately 45°.

5. The device according to claim 4, wherein the axis of symmetry is arranged so as to be essentially vertical, relative to the installation condition.

6. A device for cleaning vehicular exhaust gas, in particular a diesel exhaust particle filter, comprising
   a one-piece filter body which has gas flowing through it and is composed of a plurality of cuboid individual bodies and, as seen in cross-section, has a round outer contour deviating from a circular shape,
   the individual bodies located in the interior of the filter body having a square cross-section delimited by side faces, and neighboring, machined individual bodies having plane side faces adjoining the side faces of the internal individual bodies,
   wherein the side faces are arranged so as to have an oblique angle with one of an axis of symmetry of the filter body,
      a horizontal plane, seen in the installation condition of the device in a vehicle, and an underside of the filter body having a reduced curvature compared to portions of the outer contour adjoining the underside, and wherein the filter body has an oval outer contour as seen in cross-section.

7. The device according to claim 6, wherein the filter body has an elliptic outer contour as seen in cross-section.

8. A device for cleaning vehicular exhaust gas, in particular a diesel exhaust particle filter, comprising a one-piece filter body which has gas flowing through it and is composed of a plurality of cuboid individual bodies and, as seen in cross-section, has a round outer contour deviating from a circular shape, the individual bodies located in the interior of the filter body having a square cross-section delimited by side faces, and neighboring, machined individual bodies having plane side faces adjoining the side faces of the internal individual bodies, wherein the side faces are arranged so as to have an oblique angle with one of an axis of symmetry of the filter body, a horizontal plane, seen in the installation condition of the device in a vehicle, and an underside of the filter body having a reduced curvature compared to portions of the outer contour adjoining the underside, and wherein the filter body has a width which is larger than its height.

9. The device according to claim 8, wherein the axis of symmetry is perpendicular to the horizontal plane.

10. The device according to claim 8, wherein the filter body has a height which amounts to a maximum of 3.5 times the diagonal of the unmachined individual bodies.

11. The device according to claim 8, wherein the filter body has a width and a height which each are in the range from 2 to 3.5 times the diagonal of the unmachined individual bodies.

12. The device according to claim 8, wherein the filter body has a width which amounts to a maximum of 4.5 times the diagonal of the unmachined individual bodies.

13. The device according to claim 12, wherein the filter body has a height which amounts to a maximum of 3.5 times the diagonal of the unmachined individual bodies.

14. The device according to any of the claims 13, wherein the filter body has a width and a height which each are in the range from 2 to 3.5 times the diagonal of the unmachined individual bodies.

15. The device according to any of the claims 12, wherein the filter body has a width and a height which each are in the range from 2 to 3.5 times the diagonal of the unmachined individual bodies.

16. The device according to claim 8, wherein the device is included in the vehicle.

* * * * *